United States Patent
Shim et al.

(10) Patent No.: US 7,780,796 B2
(45) Date of Patent: Aug. 24, 2010

(54) APPARATUS AND METHOD FOR CONTROLLING OPERATION OF ROBOT CLEANER

(75) Inventors: In-Bo Shim, Gyeongsangnam-Do (KR); Young-Gie Kim, Seoul (KR); Hee-Suk Roh, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 775 days.

(21) Appl. No.: 11/315,187

(22) Filed: Dec. 23, 2005

(65) Prior Publication Data
US 2006/0237158 A1    Oct. 26, 2006

(30) Foreign Application Priority Data
Apr. 25, 2005    (KR)    ............. 10-2005-0034241

(51) Int. Cl.
*B08B 5/04*    (2006.01)
(52) U.S. Cl. .................. 134/56 R; 700/11; 700/297; 700/306
(58) Field of Classification Search ........... 134/18, 134/56 R; 15/319, 325; 700/11, 22, 296, 700/297, 306
See application file for complete search history.

(56) References Cited

U.S. PATENT DOCUMENTS

| | | | | |
|---|---|---|---|---|
| 5,534,762 A * | 7/1996 | Kim | ................. | 318/568.12 |
| 6,134,401 A | 10/2000 | Yun et al. | | |
| 6,385,412 B1 * | 5/2002 | Sadakuni | ................. | 399/75 |
| 7,274,166 B2 * | 9/2007 | Kim | ................. | 318/568.12 |
| 2001/0014950 A1 * | 8/2001 | Nishikawa | ................. | 713/300 |
| 2004/0236468 A1 * | 11/2004 | Taylor et al. | ................. | 700/245 |
| 2006/0076039 A1 * | 4/2006 | Song et al. | ................. | 134/21 |

FOREIGN PATENT DOCUMENTS

| | | |
|---|---|---|
| CN | 1507828 A | 6/2004 |
| GB | 2 344 748 | 6/2000 |

* cited by examiner

*Primary Examiner*—Michael Kornakov
*Assistant Examiner*—Natasha Campbell
(74) *Attorney, Agent, or Firm*—Birch, Stewart, Kolasch & Birch, LLP

(57) ABSTRACT

An apparatus for controlling an operation of a robot cleaner including: a battery installed in the robot cleaner; and a means for selectively cutting off power supply of the battery to at least one or more units operated for performing a cleaning operation when the cleaning operation of the robot cleaner is stopped. When the cleaning operation of the robot cleaner is stopped, the robot cleaner is changed to the power saving mode or to the standby mode, and accordingly, power consumption of the battery of the robot cleaner can be reduced.

5 Claims, 4 Drawing Sheets

APPARATUS AND METHOD FOR CONTROLLING OPERATION OF ROBOT CLEANER

BACKGROUND OF THE INVENTION

1. Field of the Invention

The present invention relates to a mobile robot such as a robot cleaner and, more particularly, to an apparatus and method for controlling an operation of the robot cleaner.

2. Description of the Conventional Art

In general, a mobile robot vacuum cleaner (hereinafter, 'robot cleaner') is a device for automatically cleaning an area by sucking debris such as dust from the floor while autonomously moving about in a room (e.g. a living room) of a house without a user's manipulation.

When cleaning, the robot cleaner recognizes a distance from itself to an obstacle such as furniture, office supplies or a wall in a cleaning area through a distance sensor and selectively controls a motor for rotating its left wheel and a motor for rotating its right wheel according to the recognized distance to change its direction and automatically clean the cleaning area. Herein, the robot cleaner performs the cleaning operation while moving around in the cleaning area through map information stored in an internal storage unit.

For example, the robot cleaner includes a gyro sensor for sensing a direction of the robot cleaner, an encoder for measuring a distance moved by sensing the number of rotations of a wheel of the robot cleaner, an ultrasonic sensor for sensing a distance between the robot cleaner and a target, and an infrared ray sensor for sensing an obstacle, and other numerous sensors.

However, the conventional robot cleaner has shortcomings in that because numerous high-priced sensors are installed to enable the robot cleaner to perform cleaning by precisely moving along a pre-set cleaning path, its internal structure is complicated and its fabrication cost increases.

In an effort to solve such a problem, a robot cleaner has been developed to perform cleaning by moving along an arbitrary cleaning path in a random manner.

A typical apparatus for operating a robot cleaner in accordance with the conventional art will now be described.

FIG. 1 is a block diagram showing the construction of an apparatus for operating a robot cleaner in accordance with a conventional art.

As shown in FIG. 1, the conventional apparatus for operating a robot cleaner includes: an obstacle sensing unit 1 for sensing an obstacle based on an impact amount generated when a robot cleaner going straight ahead in a specific area collides with the obstacle and generating an obstacle sense signal, a controller 2 for stopping movement of the robot cleaner based on the obstacle sense signal generated by the obstacle sensing unit 1, randomly generating a random angle, and generating a drive signal for rotating the robot cleaner according to the random angle, a left motor driving unit 3 for rotating a left motor ($M_L$) 5 of the robot cleaner at a certain speed according to the drivel signal of the controller 2; and a right motor driving unit 4 for rotating a right motor ($M_R$) 6 of the robot cleaner at a certain speed according to the drive signal of the controller 2.

FIG. 2 is a flow chart of a method for operating the robot cleaner in accordance with the conventional art.

First, when a user inputs a cleaning command signal (step S1), the controller 2 generates a drive signal to make the rotation speed of the left motor 5 and the right motor 6 equal in order to cause the robot cleaner to move straight ahead, and simultaneously outputs the drive signal to the left motor driving unit 3 and the right motor driving unit 4 (step S2).

The left motor driving unit 3 rotates the left motor 5 according to the drive signal of the controller. At this time, the right motor driving unit 4 also rotates the right motor 6 according to the drive signal of the controller 2. Namely, as the left and right motors 5 and 6 are simultaneously rotated, the robot cleaner moves straight ahead.

The obstacle sensing unit 1 senses an obstacle based on an amount of impact generated when the robot cleaner collides with the obstacle, generates an obstacle sense signal, and applies the obstacle sense signal to the controller 2 (step S3). If no obstacle sense signal is generated, the robot cleaner continuously performs cleaning operation.

The controller 2 stops moving of the robot cleaner according to the obstacle sense signal, randomly generates a random angle (step S4), generates a drive signal for rotating the robot cleaner according to the random angle, and then outputs the generated drive signal to the left and right motor driving units 3 and 4.

The left motor driving unit 3 rotates the left motor 5 according to the drive signal of the controller 2, and the right motor driving unit 4 also rotates the right motor 6 according to the drive signal of the controller. In other words, by relatively controlling the rotation speed of the left motor 5 and the rotation speed of the right motor 6 differently, the direction of the robot cleaner can be changed by the random angle (step S5).

Thereafter, when the robot cleaner is rotated by as much as the random angle, the controller allows the robot cleaner to again go straight ahead (step S6). When the cleaning operation of the robot cleaner is completed, the controller terminates the cleaning operation (step S7). If the cleaning operation of the robot cleaner is not completed, the controller allows the robot cleaner to repeatedly perform the cleaning operation routine.

In order to perform the cleaning operation, the related art robot cleaner includes a driving unit (not shown) having a suction motor and a wheel motor; a sensing unit (not shown) having a bumper sensor, a phase correction sensor and a cliff sensor; and a display module (not shown).

However, the related art cleaner has a problem that even when the cleaning operation is not performed, power of a battery is still supplied to the driving unit, the sensing unit and the display module, increasing power consumption of the battery. Namely, although the cleaning operation is terminated, power of the battery is continuously supplied to the units for performing the cleaning operation of the robot cleaner, unnecessarily consuming power of the battery.

U.S. Pat. Nos. 5,440,216 and 5,646,494 also disclose a robot cleaner.

BRIEF DESCRIPTION OF THE INVENTION

Therefore, an object of the present invention is to provide an apparatus and method for controlling an operation of a robot cleaner capable of effectively reducing power consumption of a battery installed in a robot cleaner by changing the robot cleaner to a power saving mode or to a standby mode when a cleaning operation of the robot cleaner is stopped.

To achieve these and other advantages and in accordance with the purpose of the present invention, as embodied and broadly described herein, there is provided an apparatus for controlling an operation of a robot cleaner including: a battery installed in the robot cleaner; and a means for selectively cutting off power supply of the battery to at least one or more units operated for performing a cleaning operation when the cleaning operation of the robot cleaner is stopped.

To achieve the above object, there is also provided an apparatus for controlling an operation of a robot cleaner including: a display unit for displaying an operation state of the robot cleaner, a sensing unit for sensing a position of the robot cleaner, a position of a charging station installed at a fixed object, and an obstacle; a driving unit for moving the robot cleaner; a battery installed at the robot cleaner; a controller for outputting a power saving control signal according to whether a mode of the robot cleaner is a cleaning mode or not; and a switching unit for selectively cutting off power of a battery applied to the display unit, the sensing unit and the driving unit based on the power saving control signal.

To achieve the above object, there is also provided a method for controlling an operation of a robot cleaner including: applying power of a battery installed in the robot cleaner to at least one or more units operated for performing a cleaning operation of the robot cleaner; and cutting off power of the battery applied to at least one or more units when the cleaning operation of the robot cleaner is stopped.

To achieve the above object, there is also provided a method for controlling an operation of a robot cleaner including: performing a cleaning operation by changing the robot cleaner to a cleaning mode according to a user command; and changing the cleaning mode to a power saving mode when a cleaning operation of the robot cleaner is terminated.

To achieve the above object, there is also provided an apparatus for controlling an operation of a robot cleaner, which has a display unit for displaying an operation state of the robot cleaner, a sensing unit for sensing a position of the robot cleaner, a position of a charging station installed at a fixed object, and an obstacle, a driving unit for moving the robot cleaner, and a battery installed at the robot cleaner, including: a controller for generating a control signal when the robot cleaner is in a cleaning mode, generating a first power saving control signal when the robot cleaner is in a standby mode, and generating a second power saving control signal when the robot cleaner is in a power saving mode; and a switching unit for applying power of the battery to the display unit, the sensing unit and the driving unit based on the control signal, cutting off power supply of the battery to the sensing unit and the driving unit based on the first power saving control signal, and cutting off power supply of the battery to the display unit based on the second power saving control signal.

To achieve the above object, there is also provided an apparatus for controlling an operation of a robot cleaner including a means for selectively cutting off power supply to at least one or more units operated for performing a specific operation when the specific operation of the mobile robot is stopped.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The apparatus and method for controlling an operation of a robot cleaner capable of effectively reducing power consumption of a battery installed in a robot cleaner by changing the robot cleaner to a power saving mode or to a standby mode when a cleaning operation of the robot cleaner is stopped, in accordance with a preferred embodiment of the present invention will now be described with reference to FIGS. 3 and 4.

Figure 1:
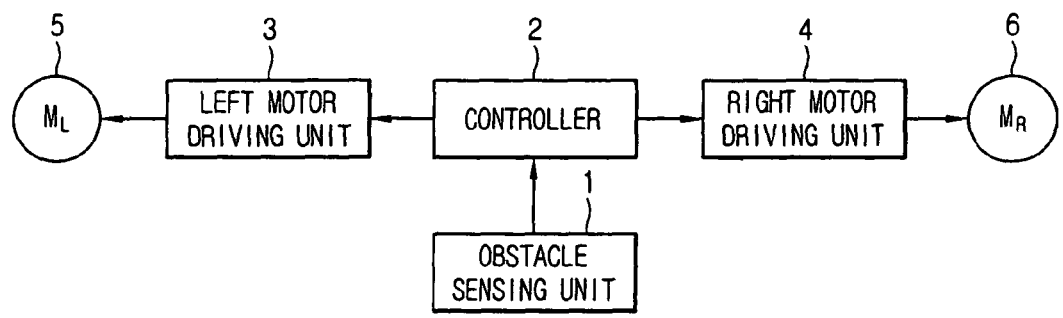
FIG. 1 is a schematic block diagram showing the construction of an apparatus for controlling an operation of a robot cleaner in accordance with a related art.
Figure 2:
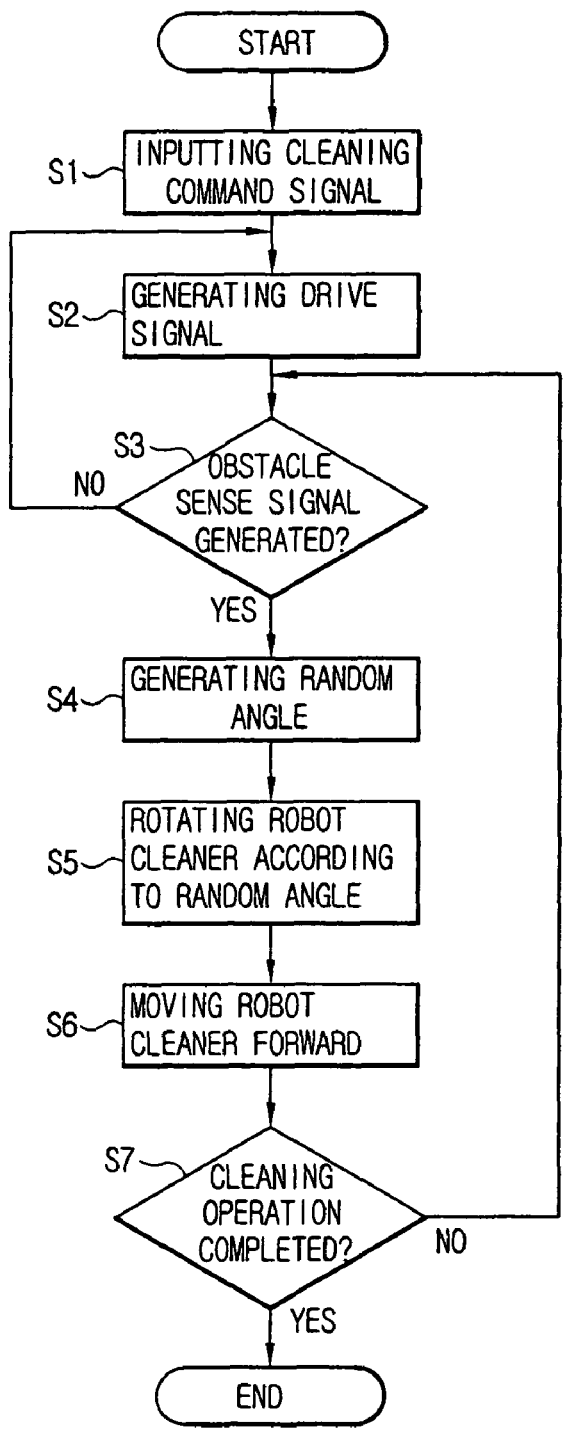
FIG. 2 is a flow chart illustrating the process of a method for controlling the operation of the robot cleaner in accordance with the related art.
Figure 3:
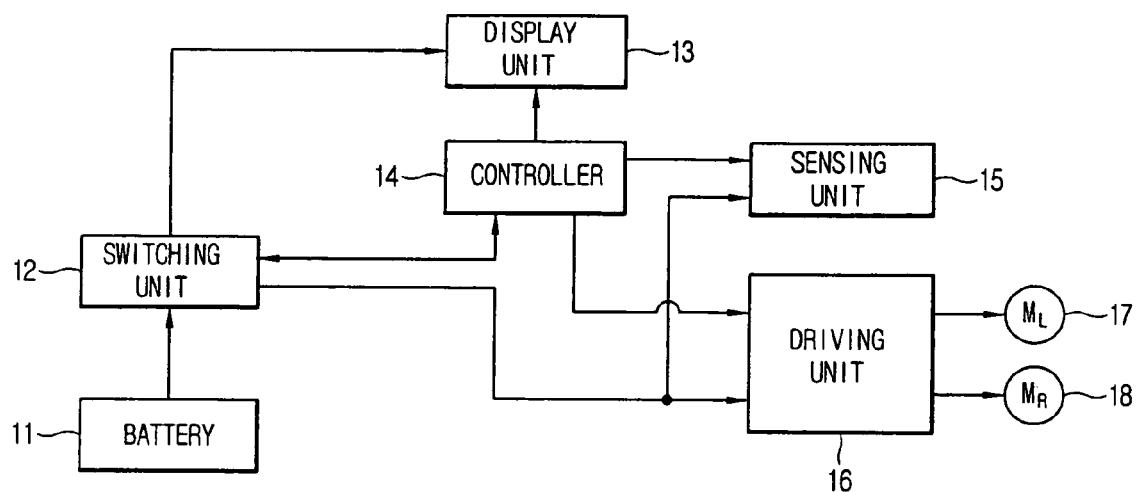
FIG. 3 is a schematic block diagram showing the construction of an apparatus for controlling an operation of a robot cleaner in accordance with the present invention.

FIG. 3 is a schematic block diagram showing the construction of an apparatus for controlling an operation of a robot cleaner in accordance with the present invention.

As shown in FIG. 3, the apparatus for controlling an operation of the robot cleaner includes: a display unit 13 for displaying various operation states of the robot cleaner; a sensing unit 15 for sensing a position of the robot cleaner, a position of a charging station installed on a fixed object such as a wall of a house, an obstacle and a cliff; a driving unit 16 for moving the robot cleaner according to a control signal; a battery 11 installed inside the robot cleaner and supplying power; a controller 14 for outputting a power saving control signal for selectively applying power of the battery 11 to the driving unit 16; and a switching unit 12 for selectively applying power of the battery 11 to the display unit 13, the sensing unit 15 and the driving unit 16 based on the power saving control signal.

When a cleaning operation of the robot cleaner is stopped through the switching unit 12, the controller 14 cuts off power supply of the battery 11 to the units (e.g., the display unit 13, the sensing unit 15 and the driving unit 16) operated for performing the cleaning operation, thereby effectively reducing power consumption of the battery 11.

The driving unit 16 includes a suction motor and a wheel motor according to the related art, and the sensing unit 15 includes a bumper sensor, a phase correction sensor and a cliff sensor.

The operation of the apparatus for controlling an operation of the robot cleaner will now be described. The driving unit 16, the sensing unit 15, the display unit 13, the left motor ($M_L$) 17 and the right motor ($M_R$) 18 are the same as those in the related art, description of which is thus omitted.

First, when a cleaning command signal is inputted by a user, the controller 14 drives a drive signal to make a rotation speed of the left motor 17 and the right motor 18 correspond to each other in order to make the robot cleaner go straight ahead, and outputs the drive signal to the driving unit 16.

The driving unit 16 rotates the left motor 17 and the right motor 18 according to the drive signal of the controller 14. Namely, as the left motor 17 and the right motor 18 are simultaneously rotated, the robot cleaner goes straight ahead. At this time, the driving unit 16 drives the suction motor (not shown) to suck dust.

The sensing unit 15 senses a position of the robot cleaner, a charging station installed at a fixed object such as a wall of a house, an obstacle or a cliff, generates sense signals, and applies the sense signals to the controller 14.

The controller 14 generates a direction control signal for controlling the direction of the robot cleaner according to the sense signals, and outputs the generated direction control signal to the driving unit 16.

The driving unit 16 rotates the left motor 17 or the right motor 18 according to the direction control signal of the controller 14. Namely, by controlling the rotation speed of the left motor 17 and the rotation speed of the right motor 18 differently, the direction of the robot cleaner can be controlled.

Thereafter, when the robot cleaner is determined to have finished cleaning operation, the controller 14 terminates the cleaning operation, and otherwise, the controller 14 repeatedly performs the cleaning operation. In this case, when the cleaning operation is completed, the display unit 13 displays a cleaning completion message on a screen.

The operation of the controller 14 and the switching unit 12 for effectively reducing power consumption of the battery 11 installed in the robot cleaner will be described in detail with reference to FIG. 4 as follows.

Figure 4:
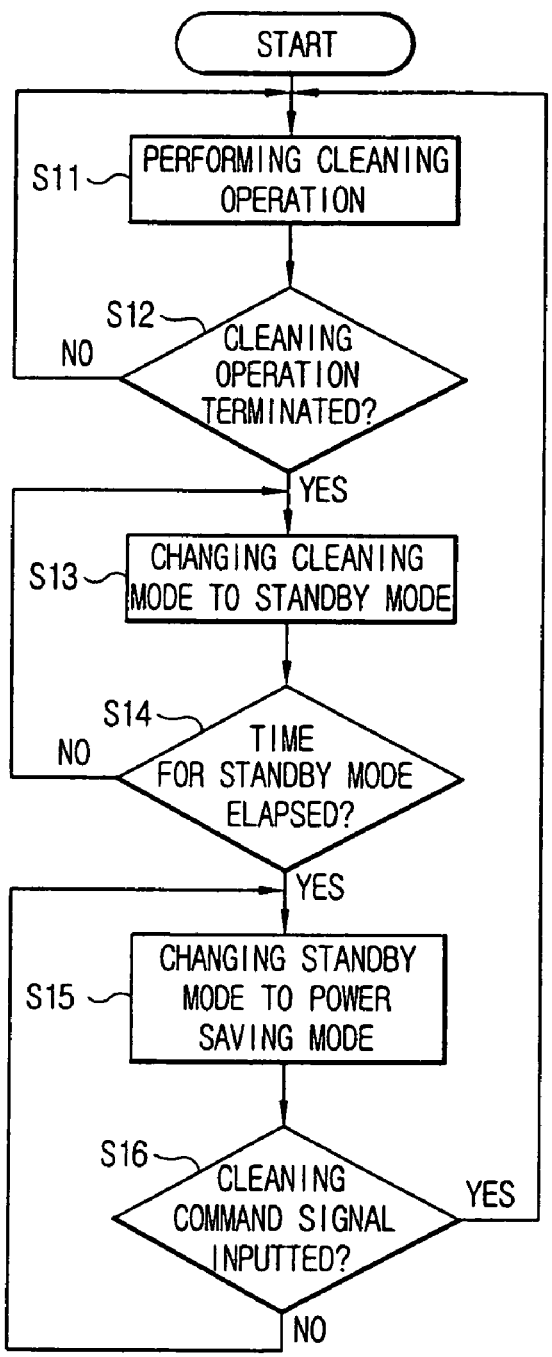
FIG. 4 is a flow chart illustrating the process of a method for controlling the operation of the robot cleaner in accordance with the present invention.

FIG. 4 is a flow chart illustrating the process of a method for controlling the operation of the robot cleaner in accordance with the present invention.

First, when the robot cleaner is changed to a cleaning mode by a user, the controller 14 generates a control signal and outputs it to the switching unit 12 to perform the cleaning operation. For example, when the robot cleaner is changed to a cleaning mode, the controller 14 outputs the control signal for applying power of the battery 11 to the units operated for performing the cleaning operation of the robot cleaner such as the display unit 13, the driving unit 16 and the sensing unit 15, to the switching unit 12 (step S11).

The switching unit 12 applies power of the battery 11 to the display unit 13, the driving unit 16 and the sensing unit 15.

Thereafter, the controller 14 checks whether the cleaning operation has been terminated (step S12). When the cleaning operation is terminated, the controller 14 changes the cleaning mode to a standby mode (step S13).

When the robot cleaner is changed from the cleaning mode to the standby mode, the controller 14 generates a first power saving control signal for cutting off power of the battery applied to the driving unit 16, and applies it to the switching unit 12.

Then, the switching unit 12 cuts off power applied to the sensing unit 15 and the driving unit 16 based on the first power saving control signal, and applies power of the battery 11 only to the display unit 13 and the controller 14.

Thereafter, the controller 14 checks whether the standby mode has been maintained for a pre-set time (e.g., 5~10 seconds). When the time for the standby mode of the robot cleaner elapses (step S14), the standby mode is changed to a power saving mode (step S15). At this time, the display unit 13 displays a cleaning operation completion message on the screen of the robot cleaner for the pre-set time.

When the robot cleaner is in the power saving mode, the controller 14 generates the second power saving control signal for cutting off power of the battery 11 applied to the display unit 13, and applies the second power saving control signal to the switching unit 12.

The switching unit 12 cuts off power of the battery 11 applied to the display unit 13 based on the second power saving control signal, and applies power of the battery 11 only to the controller 14. The switching unit 12 always applies power of the battery 11 to the controller 14 so that the controller 14 can control the cleaning mode, the standby mode and the power saving mode. Namely, when the robot cleaner is in the power saving mode, the controller 14 cuts off power of the battery 11 applied to the display unit 13, the sensing unit 15 and the driving unit 16, and applies power of the battery only to the controller 14.

Thereafter, when the robot cleaner is changed to the cleaning mode from the power saving mode according to a user command (namely, when a cleaning command signal is inputted), the controller 14 outputs a control signal for applying power of the battery 11 to the units operated for performing the cleaning operation of the robot cleaner such as the display unit 13, the driving unit 16 and the sensing unit 15, to the switching unit 12.

In this manner, in the present invention, when the cleaning operation of the robot cleaner is completed, the power of the battery applied to the display unit 13, the sensing unit 15 and the driving unit 16 of the robot cleaner is cut off, thereby effectively reducing power consumption of the battery.

In addition, by cutting off power of the battery applied to any other units operated for performing the cleaning operation of the robot cleaner, as well as the display unit 13, the sensing unit and the driving unit 16 of the robot cleaner, power consumption of the battery can be further reduced.

As so far described, the apparatus and method for controlling an operation of the robot cleaner in accordance with the present invention have many advantages.

That is, when the cleaning operation of the robot cleaner is stopped, the robot cleaner is changed to the power saving mode or to the standby mode, and accordingly, power consumption of the battery of the robot cleaner can be reduced. For example, when the cleaning operation of the robot cleaner is stopped, power of the battery applied to the units operated for performing the cleaning operation of the robot cleaner can be cut off, so that power consumption of the battery can be effectively reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for controlling an operation of a robot cleaner comprising:

a display unit for displaying an operation state of the robot cleaner;

a sensing unit for sensing an obstacle;

a driving unit for moving the robot cleaner;

a battery installed at the robot cleaner;

a controller for changing a cleaning mode to a standby mode when a cleaning operation of the robot cleaner is terminated, outputting a first power saving control signal when the robot cleaner is changed from the cleaning mode to the standby mode, and for changing the standby mode to a power saving mode when a first pre-set time elapses after the cleaning operation is terminated, and outputting a second power saving control signal when the robot is in the power saving mode; and a switching unit for selectively cutting off power of the battery applied to the display unit, the sensing unit, and the driving unit according to the first power saving control signal and the second power saving control signal,
wherein the switching unit cuts off the power of the battery applied to the driving unit and the sensing unit according to the first power saving control signal, and cuts off the power of the battery applied to the display unit according to the second power saving control signal.

2. The apparatus of claim 1, wherein when the robot cleaner is in the cleaning mode, the switching unit applies power of the battery to the display unit, the driving unit and the sensing unit.

3. The apparatus of claim 1, wherein when the cleaning operation of the robot cleaner is stopped, the display unit displays a cleaning completion message for a second pre-set time.

4. The apparatus of claim 1, wherein the first pre-set time is 5~20 seconds.

5. The apparatus of claim 1, wherein the controller restores power to the display unit, the sensing unit and driving unit after a cleaning command signal is inputted.

* * * * *